United States Patent [19]

Eshelman

[11] Patent Number: 5,386,881
[45] Date of Patent: Feb. 7, 1995

[54] LAWN MOWER ENGINE OIL DRAIN EXTENSION APPARATUS

[76] Inventor: Walter L. Eshelman, 22 Carroll St., Apt. #1, Thurmont, Md. 21788

[21] Appl. No.: 237,385

[22] Filed: May 3, 1994

[51] Int. Cl.⁶ .............................................. F16C 3/14
[52] U.S. Cl. ..................... 184/1.5; 222/526; 222/527; 222/529; 56/11.5; 141/98
[58] Field of Search ............ 56/16.7, 16.8, 12.1, 56/17.5 X; 222/527, 530, 529, 526; 184/1.5; 141/98; 123/196 R

[56] References Cited

U.S. PATENT DOCUMENTS

| | | |
|---|---|---|
| 675,548 | 6/1901 | Long ................................. 222/529 |
| 1,528,027 | 3/1925 | Peterson ........................... 222/529 |
| 4,403,466 | 9/1983 | Tillotson et al. . |
| 4,806,981 | 5/1978 | Mitsui ................................. 184/1.5 |
| 4,977,978 | 12/1990 | Batrice . |
| 4,986,777 | 1/1991 | Preston . |

*Primary Examiner*—Thomas E. Denion
*Attorney, Agent, or Firm*—David L. Baker

[57] ABSTRACT

A lawnmower engine oil sump drain extension apparatus, for a lawnmower having a blade housing and an engine having an oil sump, has an oil sump drain elbow tube threadingly connected into a drain hole of the oil sump. An outer extension tube is threadingly connected to the elbow tube. The outer extension tube extends through a port in the blade housing and into a blade housing extension tube receiving chamber in the blade housing. A locking member, threadingly connects to the outer extension tube, to secure the outer extension tube to the blade housing. An inner extension tube is telescopingly placed within the outer extension tube. There is at least one sealing member, having a replaceable resilient seal thereon, on the inner extension tube to provide a seal between the inner extension tube and the outer extension tube. There is a stop member on the inner extension tube. There is an inner extension tube locking member, threadingly connected to the outer extension tube and that has a resilient gripping washer placed therein. The sealing member has a first ringlike protrusion with a removable and replaceable resilient seal thereon. The stop member has a second ringlike protrusion that has a removable and replaceable resilient seal thereon. There is an inner extension support bracket and extension lock member, connected to the inner extension tube, releasably connected to a receiving bracket on a wall of the blade housing extension tube receiving chamber.

6 Claims, 4 Drawing Sheets

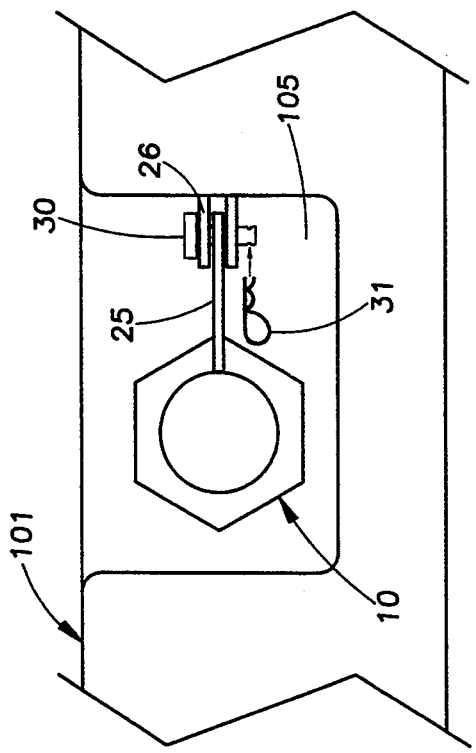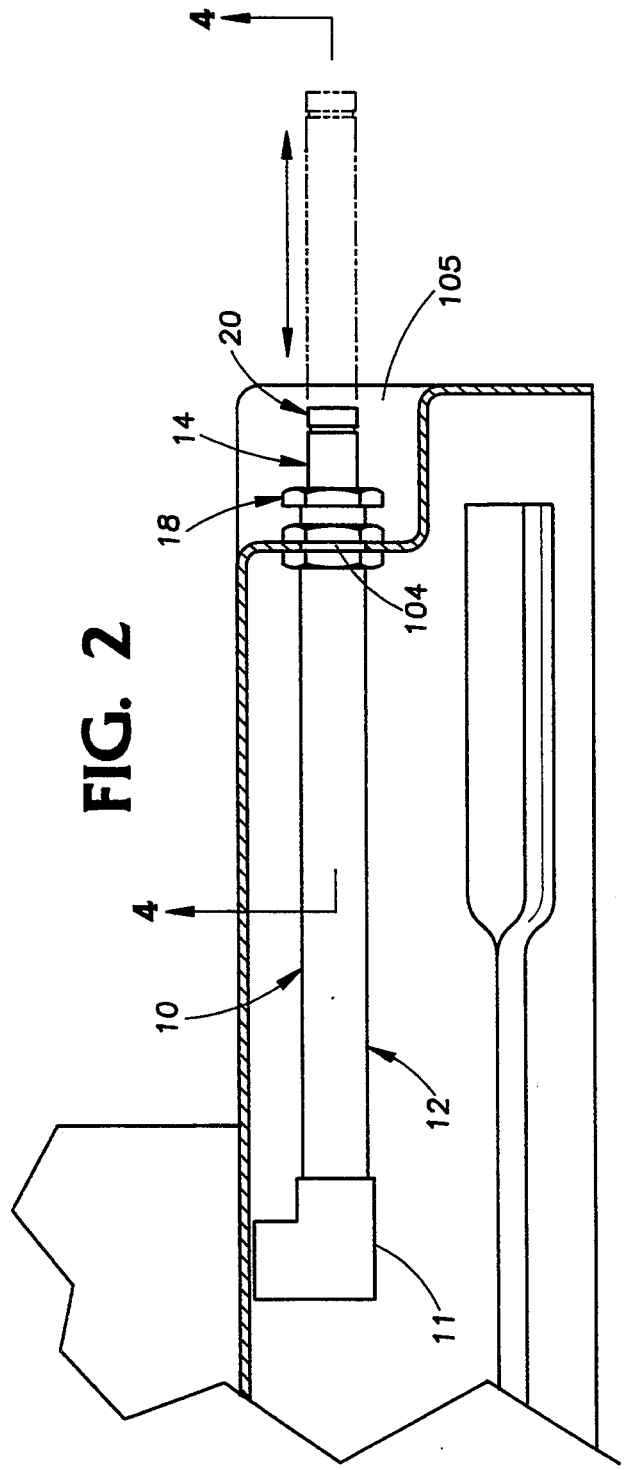

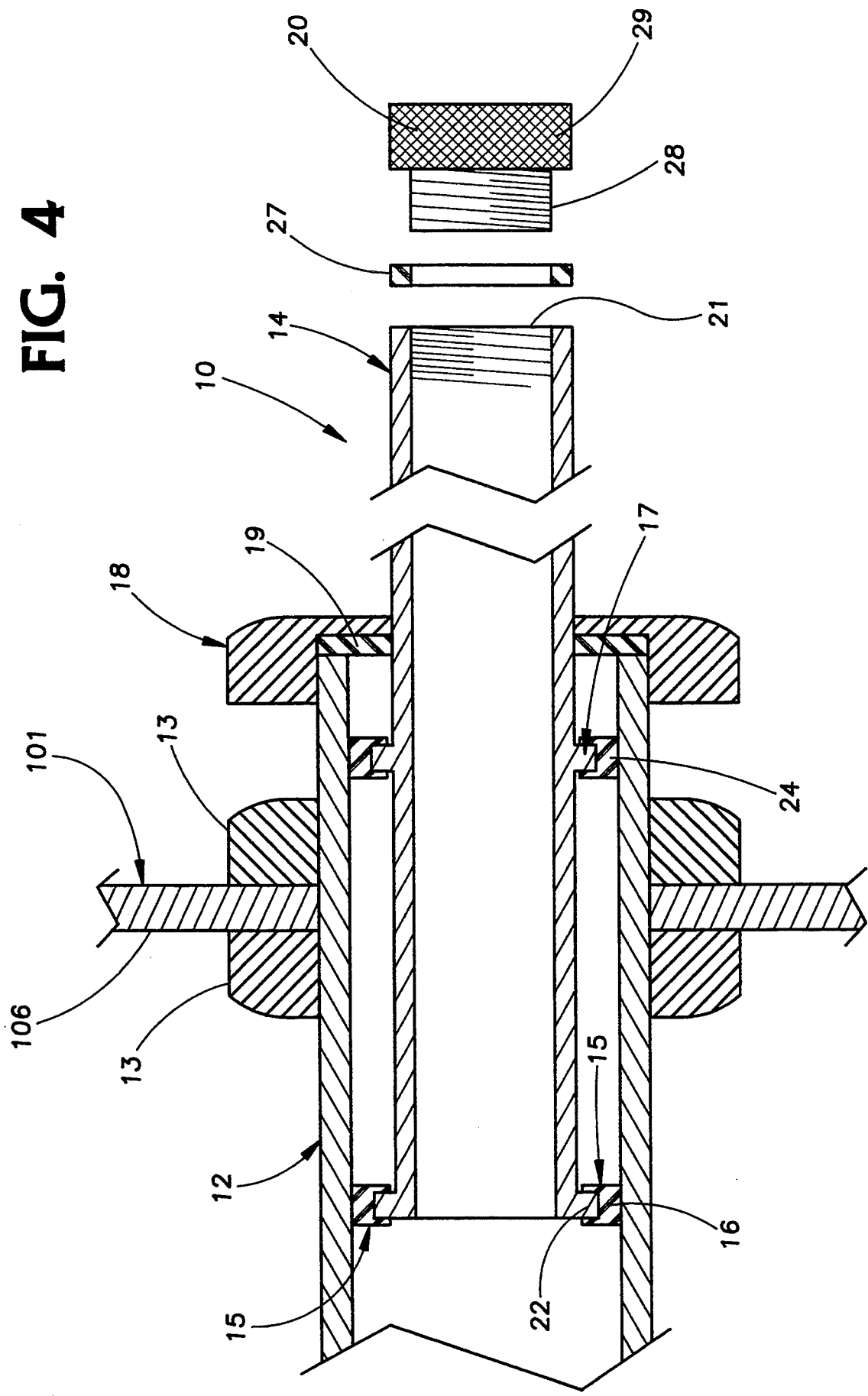

LAWN MOWER ENGINE OIL DRAIN EXTENSION APPARATUS

BACKGROUND OF THE INVENTION

1. Field of the Invention

This invention relates to an oil sump drain extension for a power lawnmower.

2. Description of the Related Art

Draining the oil from an engine of a rotary lawn mower is often difficult since the mower has to be tipped over to gain access to and remove the drain plug. This often results in spilling of the oil. Other patents have tried to solve this problem in different ways but they still did not offer the convenience and ease needed.

U.S. Pat. No. 4,403,466 to H. B. Tillotson, et al., on Sep. 13, 1983 for a Lawn Mower Engine Oil Drain describes a dipstick oil tube movable from a first vertical position to a second horizontal position. In the second position, the oil may be drained from the sump.

U.S. Pat. No. 4,977,978 to M. P. Batrice on Dec. 18, 1990 for an Automobile Oil Change Apparatus shows a key operated drain valve attached to an oil filter that has a power assist to drain the oil from the oil sump.

U.S. Pat. No. 4,986,777 to D. G. Preston on Jan. 22, 1991 for a Marine Engine Drainage Device describes a tube connected to the drain hole in the oil pan of a marine inboard engine. There is an inner valve in the line activated by selectively inserting a second device into the line and into the valve thereby opening the valve by pushing it back and allowing the oil to flow from the sump.

The present invention solved this problem by providing an extendible two-piece tubing connected to the engine oil sump above the blade and passing through the blade housing and beyond the housing allowing the oil to be easily drained into a container placed to the side of the mower with little or no tipping necessary.

SUMMARY OF THE INVENTION

Oil changes are necessary to extend the life of a lawnmower engine. However, changing the oil necessitates turning the mower over in order to gain access to the drain plug on the underside of the motor where it extends through the blade housing. Once the mower is turned over, the grass and dirt must be scrapped off from around the drain plug to gain access to it. Placing an elbow fitting into the drain plug hole and connecting telescoping tubing to the elbow and running the tubing out to the side of the blade housing in the manner of the present invention allows a user to drain the old oil from an engine with ease with less chance of spillage or contamination of the oil sump with grass and dirt.

In one aspect of the present invention, a lawnmower oil sump drain extension apparatus, for a lawnmower having a blade housing and an engine having an oil sump, is described that has a oil sump drain elbow tube connected into a drain hole of the oil sump. An outer extension tube is connected to the elbow tube and extends through a port in the blade housing and into a blade housing extension tube receiving chamber in the blade housing. An inner extension tube is telescopingly placed within the outer extension tube. There is a sealing plug connected to one end of the inner extension tube.

In another aspect of the present invention, a lawnmower oil sump drain extension apparatus, for a lawnmower having a blade housing and an engine having an oil sump, is described that has a oil sump drain elbow tube connected into a drain hole of the oil sump. There is an outer extension tube connected to the elbow tube. The outer extension tube extends through a port in the blade housing and into a blade housing extension tube receiving chamber in the blade housing. There is a locking member, connected to the outer extension tube, to secure the outer extension tube to the blade housing. An inner extension tube is telescopingly placed within the outer extension tube. There is at least one sealing member on the inner extension tube to provide a seal between the inner extension tube and the outer extension tube. There is a stop member on the inner extension tube and a sealing plug connected to one end of the inner extension tube.

It is an object of this invention to provide an extendible oil drain apparatus to drain the oil from the engine sump of a lawnmower engine without having to tip over the blade housing to remove the drain plug.

BRIEF DESCRIPTION OF THE DRAWINGS

FIG. 2 is an enlarged elevational view of the oil drain extension apparatus shown in an enlarged partial cross-sectional view of the lawnmower blade housing along lines 2—2 and showing the extension apparatus being extended from a closed position to an extended position.

FIG. 3 is an enlarged front elevational view of the extension apparatus shown on an enlarged partial view of the lawnmower blade housing.

FIG. 4 is an enlarged partial cross-sectional view of the extension apparatus taken along lines 4—4.

DESCRIPTION OF THE PREFERRED EMBODIMENTS

Figure 1:
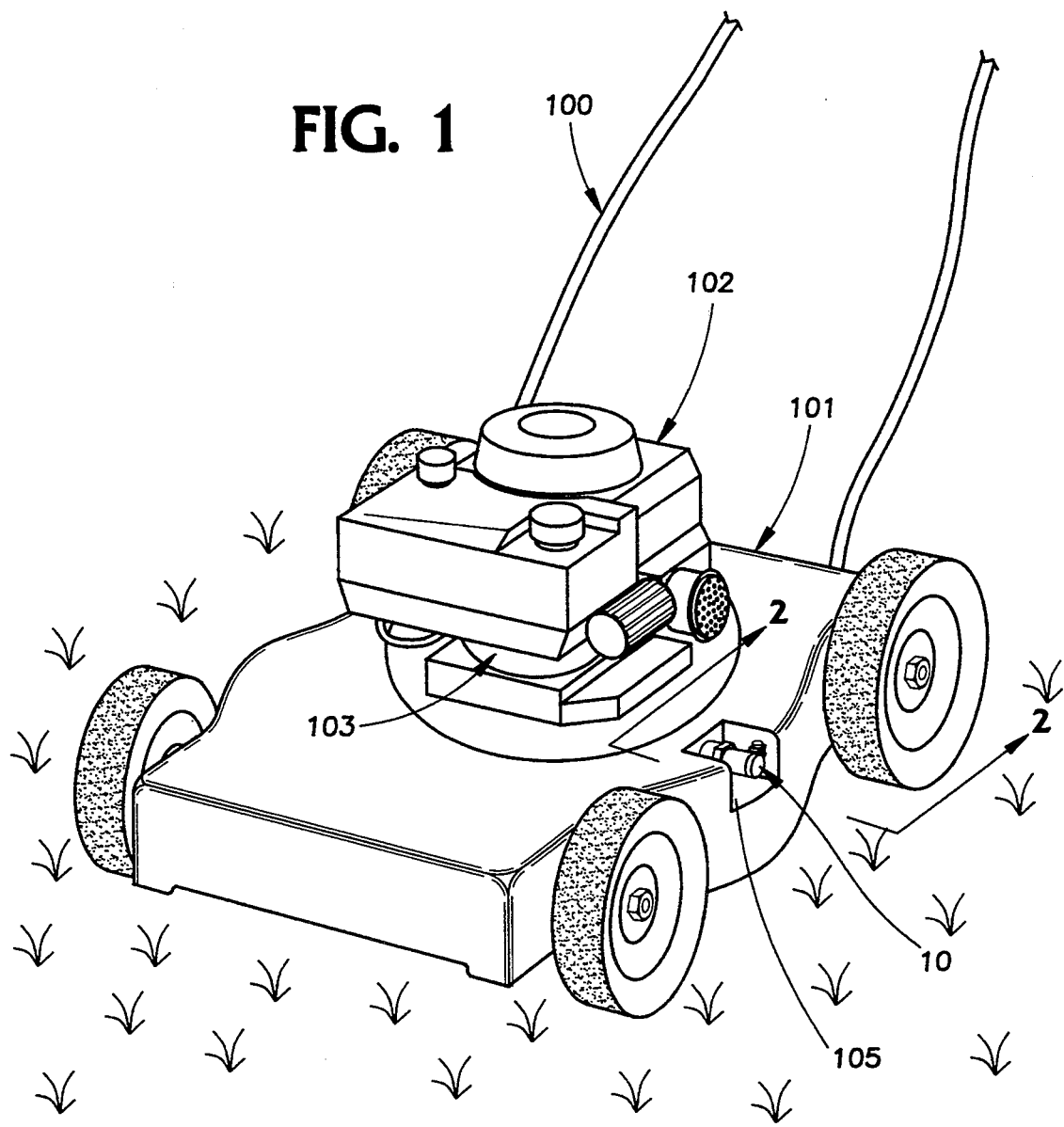
FIG. 1 is a partial perspective view of a lawnmower showing the Lawn Mower Engine Oil Drain Extension Apparatus thereon in the non-extended position.
Figure 5:
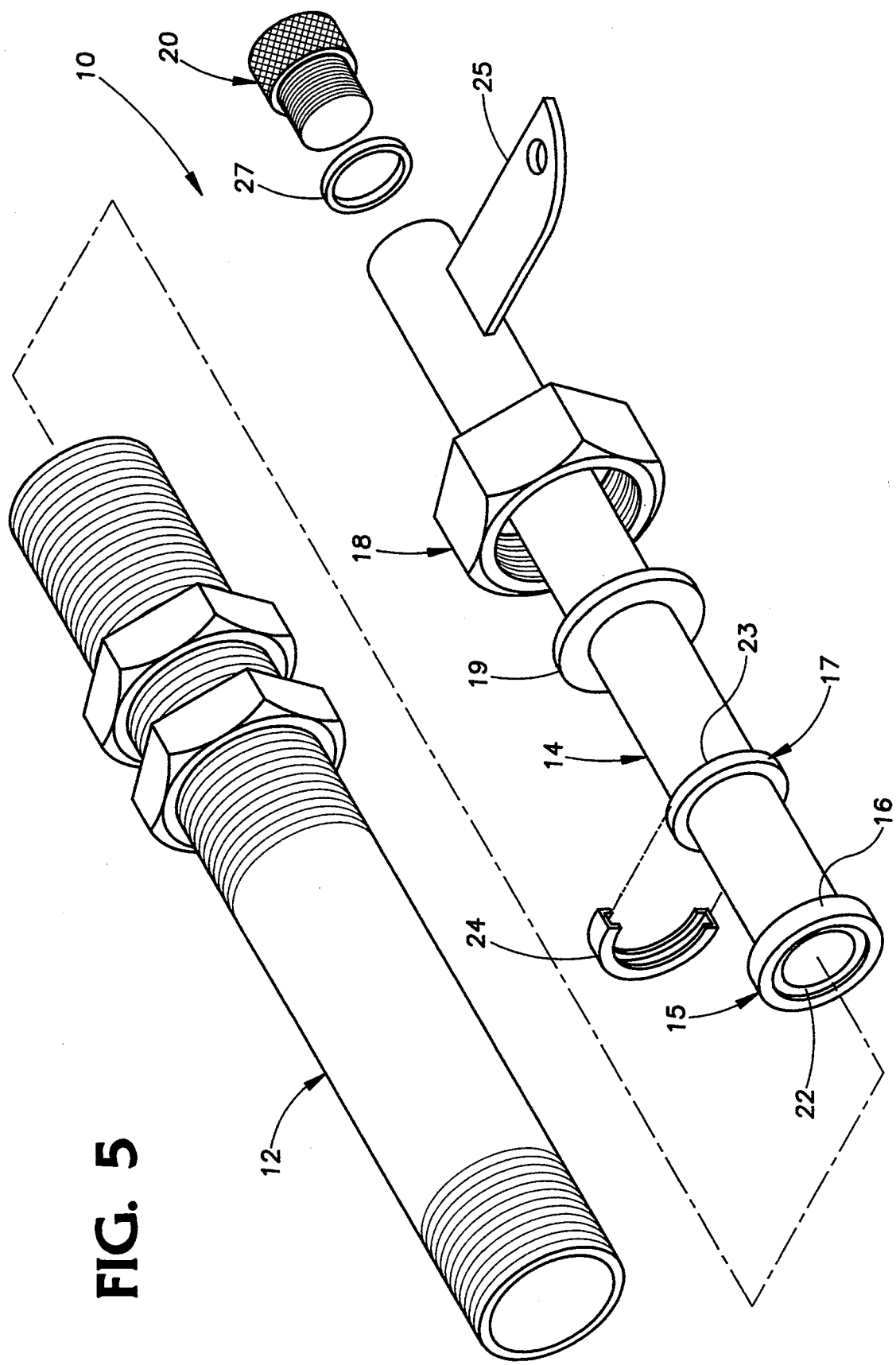
FIG. 5 is an enlarged exploded view of the extension apparatus.

Referring to FIGS. 1 through 5, a lawnmower engine oil sump drain extension apparatus 10, for a lawnmower 100 having a blade housing 101 and an engine 102 having an oil sump 103, is shown and described that has an oil sump drain elbow tube 11 threadingly connected into a drain hole (not shown) of the oil sump 103. An outer extension tube 12 is threadingly connected to the elbow tube 11. The outer extension tube 12 extends through a port 104 in the blade housing 101 and into a blade housing extension tube receiving chamber 105 in the blade housing 101. There is a locking member 13 (consisting of two nuts, threadingly connected to the outer extension tube 12 and on opposite sides of the wall 106 of the blade housing extension tube receiving chamber 105, to secure the outer extension tube 12 to the blade housing 101.

An inner extension tube 14 is telescopingly placed within the outer extension tube 11. There is at least one sealing member 15, having a replaceable resilient seal 16 thereon, on the inner extension tube 14 to provide a seal between the inner extension tube 14 and the outer extension tube 12. There is a stop member 17 on the inner extension tube 14. There is an inner extension tube locking member 18, threadingly connected to the outer extension tube 11, that has a resilient gripping washer 19 placed therein. The resilient gripping washer 19 is distortingly expanded when the inner extension tube locking member 18 is tightened on the outer extension tube 11 causing the resilient gripping washer 19 to releasingly grip and seal against the inner extension tube 14. A sealing plug 20 is connected to one end 21 of the inner extension tube 14 to selectively prevent the flow of oil (not shown) from the engine oil sump 103 via the elbow tube 11, the outer extension tube 12 and the inner extension tube 14 respectively. The sealing plug 20 has a sealing plug washer 27 to reduce leakage from around the sealing plug threads 28. The sealing member 16 has a first ringlike protrusion 22, attached to the inner extension tube, with a removable and replaceable resilient seal 16 thereon. The stop member 17 has a second ringlike protrusion 23, attached to the inner extension tube, that has a removable and replaceable resilient seal 24 thereon. There is a knurled gripping surface 29 on the sealing plug 20. There is an inner extension tube support bracket and extension lock member 25 (See FIGS. 3 and 5), connected to the inner extension tube 14, releasably connected to a receiving bracket 26 on a wall 106 of the blade housing extension tube receiving chamber 105.

In operation, the inner extension tube locking member 18 is loosened, the inner extension tube support bracket and extension lock member 25 is unpinned (see FIG. 3 and pin 30 and release clip 31) from receiving bracket 26 on wall 106 of the blade housing extension tube receiving chamber 105. The inner extension tube 14 is then telescoped out to the extended position from the closed position from within outer extension tube 12. The sealing plug 20 is unscrewed and removed from the end of the inner extension tube 14 and the oil is allowed to drain into a proper receptacle. Once the oil is drained, the sealing plug is placed back on the end of the inner extension tube, the inner extension tube is pushed back within the outer extension tube to the closed position, the inner extension tube support bracket and extension lock member 25 is repinned to the receiving bracket 26, the inner extension tube locking member 18 is retightened and new oil is added placed into the engine.

The foregoing descriptions and drawings of the invention are explanatory and illustrative only, and various changes in shape, sizes and arrangements of parts as well certain details of the illustrated construction may be made within the scope of the appended claims without departing from the true spirit of the invention.

I claim:

1. A lawnmower oil sump drain extension apparatus, for a lawnmower having a blade housing and an engine having an oil sump, comprising:
   (a) an oil sump drain elbow tube connected into a drain hole of the oil sump;
   (b) an outer extension tube connected to the elbow tube and extending through a port in the blade housing and into a blade housing extension tube receiving chamber in the blade housing;
   (c) an inner extension tube telescopingly placed within the outer extension tube; and
   (d) a sealing plug connected to one end of the inner extension tube.

2. A lawnmower oil sump drain extension apparatus, for a lawnmower having a blade housing and an engine having an oil sump, comprising:
   (a) an oil sump drain elbow tube connected into a drain hole of the oil sump;
   (b) an outer extension tube connected to the elbow tube and extending through a port in the blade housing and into a blade housing extension tube receiving chamber in the blade housing;
   (c) a locking member, connected to the outer extension tube, to secure the outer extension tube to the blade housing;
   (d) an inner extension tube telescopingly placed within the outer extension tube;
   (e) at least one sealing member on the inner extension tube to provide a seal between the inner extension tube and the outer extension tube;
   (f) a stop member on the inner extension tube; and
   (g) a sealing plug connected to one end of the inner extension tube.

3. A lawnmower oil sump drain extension apparatus, for a lawnmower having a blade housing and an engine having an oil sump, comprising:
   (a) an oil sump drain elbow tube threadingly connected into a drain hole of the oil sump;
   (b) an outer extension tube threadingly connected to the elbow tube and extending through a port in the blade housing and into a blade housing extension tube receiving chamber in the blade housing;
   (c) a locking member, threadingly connected to the outer extension tube, to secure the outer extension tube to the blade housing;
   (d) an inner extension tube telescopingly placed within the outer extension tube;
   (e) at least one sealing member, having a replaceable resilient seal thereon, on the inner extension tube to provide a seal between the inner extension tube and the outer extension tube;
   (f) a stop member on the inner extension tube;
   (g) an inner extension tube locking member, threadingly connected to the outer extension tube and having a resilient gripping washer placed therein, releasingly gripping the inner extension tube; and
   (h) a sealing plug connected to one end of the inner extension tube.

4. A lawnmower oil sump drain extension apparatus as described in claim 3 wherein the sealing member comprises a first ringlike protrusion, attached to the inner extension tube, having a resilient seal thereon.

5. A lawnmower oil sump drain extension apparatus as described in claim, 3 wherein the stop member comprises a second ringlike protrusion, attached to the inner extension tube, having a resilient seal thereon.

6. A lawnmower oil sump drain extension apparatus as described in claim 3 further comprising an inner extension support bracket and extension lock member connected to the inner extension tube and releasably connected to a receiving bracket on a wall of the blade housing extension tube receiving chamber.

* * * * *